United States Patent [19]

Takeda et al.

[11] Patent Number: 4,468,429
[45] Date of Patent: Aug. 28, 1984

[54] FIBER REINFORCED INORGANIC HARDENED BODY AND PROCESS FOR ITS PRODUCTION

[75] Inventors: Ryuichiro Takeda, Kamakura; Naoaki Fujita, Tokyo, both of Japan

[73] Assignee: Asahi Glass Company Ltd., Tokyo, Japan

[21] Appl. No.: 433,144

[22] Filed: Oct. 6, 1982

[30] Foreign Application Priority Data

Oct. 27, 1981 [JP] Japan ............................ 56/170753

[51] Int. Cl.³ .......................................... B32B 5/16
[52] U.S. Cl. .................................. 428/283; 264/257; 264/258; 264/333; 428/105; 428/247; 428/255; 428/268; 428/273; 428/285; 428/287; 428/290; 428/331; 428/340; 428/392; 428/703

[58] Field of Search ............... 428/70, 703, 331, 297, 428/298, 268, 273, 255, 247, 392, 283, 285, 287, 323, 340, 105, 290; 264/257, 258, 333

[56] References Cited

U.S. PATENT DOCUMENTS 4,250,134  2/1981  Minnick ........................... 264/333
4,265,979  5/1981  Baehr et al. ..................... 264/333
4,344,804  8/1982  Bijen et al. ...................... 264/333

Primary Examiner—James J. Bell
Attorney, Agent, or Firm—Oblon, Fisher, Spivak, McClelland & Maier

[57] ABSTRACT

A fiber reinforced inorganic hardened body comprises an inorganic hardened material and a fiber reinforcing material, wherein the fiber reinforcing material has a water permeability of from 5 to 27 l/min. and a volume reduction rate of at most 10%.

24 Claims, 1 Drawing Figure

FIBER REINFORCED INORGANIC HARDENED BODY AND PROCESS FOR ITS PRODUCTION

BACKGROUND OF THE INVENTION

1. Field of the Invention

The present invention relates to a fiber reinforced inorganic hardened body and a process for its production. More particularly, it relates to an inorganic hardened body, particularly a cement mortar hardened body, reinforced by a fiber reinforcing material, particularly a glass fiber reinforcing material, in a form of a loopy mat wherein a plurality of fiber strands are piled in an irregular loopy fashion, or in a form of a continuous mat or net, and a process for its production.

2. Description of the Prior Art

A glass fiber reinforced cement (hereinafter referred to as "GRC") is known as a typical example of the fiber reinforced inorganic hardened body.

As typical methods for producing the fiber reinforced inorganic hardened body represented by such GRC, there have been known a so-called direct spray method in which cement mortar and glass fibers are simultaneously sprayed by guns onto a mold surface to form a GRC layer, which is then released from the mold to obtain a formed body, and a so-called premix method in which cement mortar premixed with glass fibers is fed into a predetermined mold and molded therein. The former method is suitable for the production of a generally flat thin product. It is thereby possible to maintain a water/cement ratio at a relatively low level, whereby a product having fairly satisfactory strength is obtainable. However, a loss of the materials is substantial, the thickness tends to be uneven, and it is thereby difficult to obtain a smooth flat surface having no substantial defects. Further, the fibers tend to localize, and this fact leads to formation of voids or local concentration of the mortar, and thus weak portions are likely to form, whereby the strength tends to be uneven. Furthermore, the fibers and cement tend to be separated from each other to form a layered structure which is susceptible to separation into layers when a shearing force is exerted thereto. Whereas, according to the latter premix method, the thickness of the product can relatively freely be chosen. However, this method has a disadvantage that the fibers are susceptible to damages when they are mixed with the cement mortar. Further, the fibers tend to be formed into balls. It is further necessary to adjust the water/cement ratio at a relatively high level in order to maintain the flowability, whereby the strength of the formed product tends to be low.

Further, in both of the above mentioned methods, so-called chopped strands having a short length are used as the fiber reinforcing material, and the strength of GRC thereby obtainable is limited to a relatively low level.

On the other hand, there have been several proposals wherein a reinforcing material of a continuous form such as a mat is used as the fiber reinforcing material for production of GRC. However, as opposed to the case of a fiber reinforced polymer (i.e. so-called FRP) where the resin as a constituent of the FRP can adequately penetrate into the fibers irrespective of the form of fibers, the cement mortar in the case of the GRC cannot adquately penetrate into the fibers without influence of the form of the fibers. Accordingly, when the above mentioned reinforcing material of a continuous form such as a mat is used, the product will have portions where no cement mortar or no adequate amount of cement mortar is present. In an attempt to overcome this difficulty, it has been proposed to give vibrations during the forming step. However, such an attempt has been found to be not so effective. There has been no proposal for a fully satisfactory forming means.

SUMMARY OF THE INVENTION

Under the circumstances, it is an object of the present invention to provide a formed product with use of a fiber reinforcing material of a continuous form, which has a smooth surface and in which the fibers and the inorganic hardening material such as cement are uniformly distributed irrespective of the thickness of the product. The present inventors have conducted various studies and researches and, as a result, have found that the above object can be attained irrespective of the form of the reinforcing material by providing certain specific properties to a fiber reinforcing material.

Thus, the present invention provides a fiber reinforced inorganic hardened body in which a fiber reinforcing material is used which has a water permeability (as defined hereinafter) of from 5 to 27 l/min. and a volume reduction rate of at most 10%.

The present invention also provides a process for producing such a fiber reinforced inorganic hardened body which comprises introducing a non-hardened hardenable inorganic material into a mold containing a fiber reinforcing material having a water permeability of from 5 to 27 l/min. and a volume reduction rate of at most 10% and aging and hardening the inorganic material.

Other objects and features of the present invention will become apparent from the following description of the preferred embodiments of the present invention.

DETAILED DESCRIPTION OF THE PREFERRED EMBODIMENTS

Figure 1:
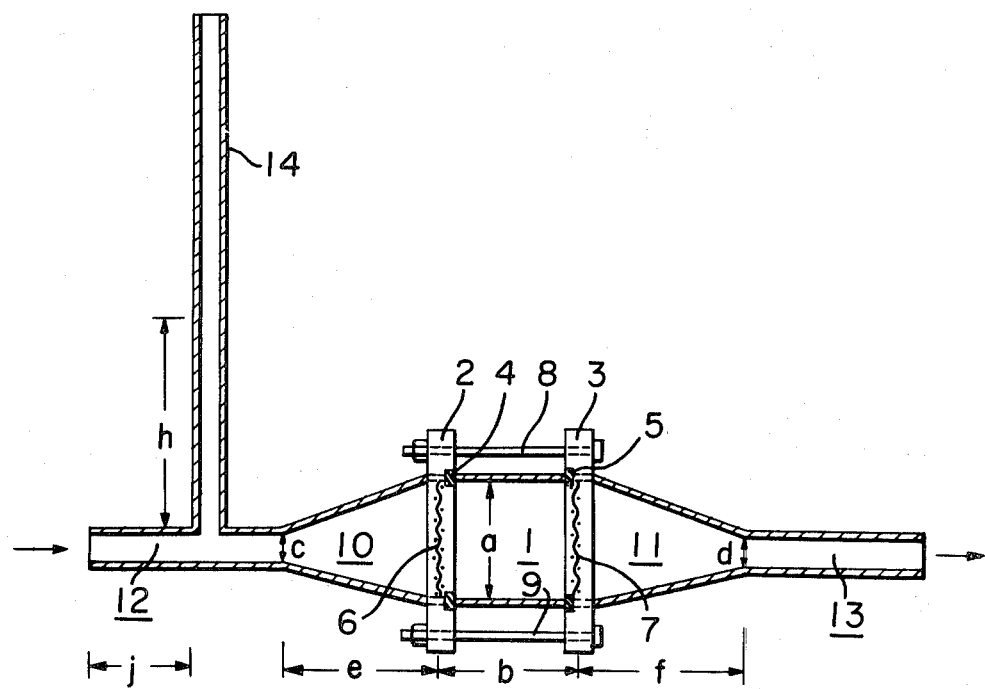
FIG. 1 is a diagrammatic view illustrating an apparatus to determine the physical properties of the fiber reinforcing material to be used in the present invention.

JIS L-1092 entitled "Methods for testing the waterproofing properties of fiber products" gives methods for measuring a water permeability of fiber products. Under this title, there is an item for tests of the water proofing properties of the fibers by means of low water pressure methods, whereby water permeability is determined by the following three methods with use of an apparatus comprising a container for sample fibers and a leveling device connected to the container via a conduit:

(1) A method in which the water level of the leveling device is raised and the water level at which water leaches out from the back side of the sample fibers, is measured.

(2) A method in which the water level of the leveling device is maintained at a predetermined level and the time till the water leaches out from the back side of the sample fibers is measured.

(3) A method in which the water level of the leveling device is maintained at a predetermined level as in the method (2) and the amount of water passed through the sample fibers during a predetermined period of time is measured.

These methods are useful for the measurement of water permeability of highly densed fiber cloth. However, it has been found that none of these methods can effectively be used for the measurement of the water permeability of such rough fibers as used in the present invention which permit the passing of a slurry containing solid components. Namely, if the roughness of the fibers exceeds a certain point, the measured value becomes to be the same as that obtained by a blank test where no fibers are present. The fiber reinforcing material used in the present invention belongs to this type of fibers.

As a result of various studies and researches to specify the fiber reinforcing material used in the present invention, the present inventors have found that it can be specified by a new concept of "water permeability".

For the purpose of the present invention, the "water permeability" is defined as follows:

A measuring apparatus is used which comprises a cylindrical measuring section having an inner diameter of 49.5 mm and a length of 48 mm and provided at each end with a wire net having openings of a size of 5.5×5.5 mm each; a truncarted cone-shaped hollow body extending outwardly from each end of the measuring section for a length of 90 mm and tapered towards the forward end having an inner diameter of 13 mm; a pipe extending outwardly from the forward end of each hollow body and having an inner diameter of 13 mm and a length of 80 mm; and a pipe extending perpendicularly (i.e. vertically) from one of the pair of the above mentioned pipes at a position 44 mm from the forward end thereof in communication therewith and having an inner diameter of 9 mm. In the above mentioned measuring section, 7.5±0.5 g of a reinforcing material is uniformly placed, and water is supplied from the pipe to which the vertically disposed pipe is attached, to maintain the water level in the vertically disposed pipe having an inner diameter of 9 mm at a height of 60 mm, whereby the amount of water passing through the measuring section is measured. The water permeability is represented by the amount (liters) of water passing through the measuring section per unit time (every minute). A reinforcing material having a water permeability of from 5 to 27 l/min. is selected for the purpose of the present invention.

The volume reduction rate for the purpose of the present invention is defined as follows:

$$\text{Volume reduction rate} = (V_1 - V_2)/V_1$$

where $V_1$ is the total volume of the measuring section and $V_2$ is the apparent volume of the fiber reinforcing material in the measuring section when water pressure is exerted thereto with a water level of 60 mm in the vertically disposed pipe in the above mentioned measurement with use of the above mentioned apparatus. A reinforcing material to be used in the present invention has a volume reduction rate of $(V_1 - V_2)/V_1 < 0.1$.

If the water permeability as defined above is less than the above mentioned range, cement mortar introduced is filtered by the fiber reinforced material in such a manner that the solid component such as cement is thereby blocked to permit only water to pass therethrough, whereby the cement mortar will not reach to the down stream portion of the fiber reinforcing material, thus leading to the formation of voids or surface roughness. On the other hand, if the water permeability exceeds the above mentioned range, the mechanical strength of the product thereby obtainable will be extremely low.

According to the present invention, it is particularly preferred to adopt a water permeability of from 16 to 25 l/min. within the above mentioned range, since the cement mortar will then be readily and adequately distributed in the fiber reinforcing material and a product having the highest mechanical strength will thereby be obtained.

If the volume reduction rate exceeds 10%, the fiber reinforcing material tends to be easily compressed and the distribution of the cement mortar in the reinforcing material tends to be inadequate, such being undesirable.

The measuring apparatus used for the determination of the water permeability according to the present invention will now be described with reference to the accompanying drawing.

Reference numeral 1 designates a measuring section, and the measuring section has an inner diameter of 49.5 mm (a) and a length of 48 mm (b) and it is provided at its both ends with wire nets 6 and 7 having a wire diameter of 1 mm$\phi$ and openings having a size of 5.5×5.5 mm each. The wire nets are held by frames 2 and 3 and packings 4 and 5. When the fiber reinforcing material, i.e. the material to be measured, is to be inserted in the measuring section 1, bolts 8 and 9 fastening the frames 2 and 3 are loosened and taken off. Reference numerals 10 and 11 designate truncated cone-shaped hollow bodies, which are connected to the respective ends of the measuring section where the wire nets are mounted. The hollow bodies have an inner diameter of 49.5 mm at their ends connected to the measuring section, and the inner diameter of their forward ends c and d is 13 mm. The length e and f of the hollow bodies 10 and 11 is 90 mm. Pipes 12 and 13 having an inner diameter of 13 mm and a length of 80 mm are connected to the respective forward ends of the hollow bodies 10 and 11. A pipe 14 having an inner diameter of 9 mm extends vertically from one of the pair of the pipes (i.e. the pipe 12 in the illustrated case) at a position (j) 44 mm from the forward end of the pipe 12 in communication with the pipe 12. In the measuring section 1 of the apparatus thus constructed, 7.5±0.5 g of a fiber reinforcing material is uniformly placed. The fiber reinforcing material is so chosen that when water is supplied in the direction shown by an arrow from the forward end of the pipe 12 and the water level (h) in the pipe 14 is maintained at 60 mm, the amount of water discharged from the apparatus through the pipe 13 will be from 5 to 27 l/min. and the volume reduction rate will not exceed 10%.

The form of the fiber reinforcing material to be used in the present invention is not critical. However, a fiber reinforcing material having a continuous form is preferably used. For instance, there may be mentioned a loopy mat prepared by piling a plurality of strands composed of a plurality of bundled filaments in a form of loops, a chopped strand mat, and other suitable mats and nets.

Among these, a fiber reinforcing material of the following type is most suitable for the purpose of the present invention. Namely, long glass fiber bundles each having a weight of from 20 to 500 g per 1,000 m are curlingly piled to form a mat in which the glass fiber bundles are coated and bound together by a binder and which has the above mentioned water permeability and volume reduction rate. The glass fibers to be used here are withdrawn from a bushing and bound together into a bundle by a binder and the weight per 1,000 m of the glass fiber bundle is determined substantially by the diameter and the number of the glass fibers used. With use of glass fiber bundles each having a weight per 1,000 m falling within the above mentioned range, good results may be obtained when the diameter of each bundle and the number of glass fibers constituting a bundle are from 10 to 30µ and from 30 to 7,000, respectively.

As the binder, there may advantageously used a liquid containing, as the solid contents, a total of about 3% by weight of a film-forming agent such as a vinyl acetate polymer or a polyester and a lubricant such as an amine type surfactant. The amount of the binder applied may preferably be from 0.5 to 2% by weight as the solid contents based on the weight of the glass fiber bundles.

The diameter of the glass fiber bundle is predetermined depending upon the size of the intended formed product. In general, the greater the size of the intended formed product is, the greater the diameter of the glass fiber bundle to be used may be selected. However, if the diameter of the glass fiber bundle is too great, the fiber distribution in the formed product tends to be non-uniform, such being undesirable. On the other hand, if the glass fiber bundle is too slender, it is likely that the inorganic material injected in the mold undergoes separation and the injection resistance becomes great, whereby the operability will be inferior and it becomes difficult for the hardenable material to reach the portion far from the injection inlet.

As a method for the preparation of such a reinforcing material, there may be mentioned, for instance, a method in which long glass fiber bundles are dropped and piled on the running conveyor. The long pass fiber bundles for the purpose of the present invention are meant to be uncut continuous glass fiber bundles or cut glass bundles having a length of at least 60 cm, preferably at least 100 cm.

The glass fiber bundles are piled on the conveyor in an irregularly curled fashion and tangled one another to form a mat. In this case, the amount of the piled fiber bundles is preferably from 300 to 1,200 g/m².

The glass fiber bundles are coated and bound together by a binder. As the binder, there may optionally be used polyvinyl acetate, an ester polymer of acrylic or methacrylic acid, a polyester resin, an epoxy resin or a vinyl acetate-ethylene copolymer. The amount of the binder is preferably from 1.5 to 48% by weight based on the glass fiber bundles.

However, it has been found by the present inventors that depending upon the nature of the binder used, it is likely that the hardening of the inorganic hardenable starting material, particularly the hardening of the cement mortar, is thereby impaired, resulting in a decrease in the strength of the product.

On the basis of this discovery, an extensive research has been conducted and, as a result, it has been found that it is most advantageous to use a hardenable liquid resin such as an unsaturated polyester, epoxy, phenol, melamine, SBR or acryl resin having an alkaline elusion rate of at most 15% by weight under the conditions mentioned hereinafter.

This resin is sprayed on the glass fiber bundles to form a thin coating thereon and then heated at a temperature of from 50° to 250° C. for from 1 to 30 minutes to harden the resin, whereby the glass fiber bundles are bound together by the hardened resin and a thin layer of the hardened resin is formed on the surface of the glass fiber bundles. Thus, it is possible to obtain a mat which is most suitable for the purpose of the present invention.

As the preferred hardened resin, there may advantageously used a mixture of a liquid unsaturated polyester resin and styrene (the mixing ratio is preferably from 100:100 to 300:100). It is also possible to use an epoxy resin containing a hardening agent.

When these resins are used as the binder for the glass fiber bundle mat and the mat is immersed in a 1% NaOH aqueous solution at 20° C. for 5 minutes, the amount of elusion of the binder should be at most 15% by weight based on the total amount of the binder (i.e. the ignition loss).

The long glass fiber bundles constituting a mat thus obtained, are tangled with one another in a curled fashion, and the glass fiber bundles intersect one another at many points and connected with one another at the intersections to form a lattice structure. Consequently, the glass fiber bundles are restrained from deformation macroscopically, but they are microscopically deformable. Accordingly, when an inorganic hardenable material such as mortar is injected thereto, the glass fiber bundles do not move as a whole and there will be no localization in the distribution of the mortar. The glass fiber bundles are, however, microscopically displaceable and coarse particles of the inorganic hardenable material as well as fine particles can freely pass through the spaces in the lattice structured fiber bundles, whereby the separation of the constituents of the inorganic material is avoided.

The fiber reinforcing material to be used in the present invention may be made of various other inorganic or organic fiber reinforcing materials than the glass fibers. However, particularly preferred are alkaline resistant glass fibers.

As the inorganic hardenable material, there may optionally be used cements such as ordinary Portland cement, alumina cement, blast furnace cement, white Portland cement and rapid-hardening Portland cement, or other hardenable materials such as gypsum and calcium silicate. Further, they may be used in combination with fillers, assistants or additives such as sand, fly ash, slag, pearlite, vermiculite, diatom earth and silus.

These solid components including cement preferably have an average particle size of from 10 to 500µ. If the particle size is outside this range, there will be disadvantages such that the solid particles tend to localize in the final product or they will not adequately be distributed to the entire structure of the fiber reinforcing material.

The ratio of water to these inorganic hardenable materials (i.e. Water/Solid) is preferably from 15 to 50% by weight. If the ratio is outside this range, there will be disadvantages such that the mechanical strength of the product tends to be decrease or it is likely that the inorganic hardenable material localizes in the fiber reinforcing material.

In the present invention, the amount of the fiber reinforcing material is from 1 to 10% by weight based on the entire materials.

In the actual molding operation, the above mentioned fiber reinforcing material is placed in a mold having a desired shape for the product and an upper mold half having at its center an inlet for a mixture of a non-hardened inorganic hardenable material and water and deaeration holes, is placed thereon to close the mold. Then, the above mentioned mixture is introduced from the inlet and distributed throughout the interior of the mold while deaerating from the deaeration holes. It is preferred to introduce the mixture under vibration. Further, it is preferred to prevent water from being released from the mold as far as possible when the mixture is introduced, so that a smooth surface of the product can be formed.

Then, without releasing from the mold, the mixture is aged and hardened in the mold. The aging and hardening may be conducted at room temperature. However, it is preferably conducted at a temperature of from 40° to 70° C. in a humid atmosphere whereby a high productivity is attainable.

Now, the present invention will be described in further detail with reference to the Examples.

EXAMPLE 1

Alkaline resistant glass fiber strands each composed of 200 monofilaments having a diameter of 10μ, were piled in an irregular loopy fashion to form a mat having a bulk height of 7 mm, a water permeability of 22 l/min. and a volume reduction rate of 3%.

On the other hand, a concave iron mold having a width of 1 m, a length of 2 m and a height of 150 mm was prepared, and 6.3 kg of the above mentioned glass fiber mat was uniformly placed in the mold. Then, an iron cover having deaeration holes at the four corners and an inlet for the mixture having a diameter of 24 mm$\phi$ at the center, was placed thereon to close the mold.

A mixture comprising 3 parts by weight of Portland cement, 4.5 parts by weight of sand (2,500 blaine) and 2.5 parts by weight of water, was prepared and introduced from the above mentioned inlet into the mold at a rate of 15 kg/min. for 8 minutes by a snake type slurry pump under vibration.

Thereafter, a steam aging was conducted at 60° C. for 5 hours, and then the formed product was released from the mold. The product thereby obtained had a uniform thickness, a smooth surface and no voids. The product weighed 126 kg and the content of the glass fibers was 5% by weight.

This product was left to stand in a humid atmosphere at 20° C. for 28 days, and then cut by a diamond cutter into a size of 25×5×1.5 cm to obtain test samples. The bending test, the tensile test and the Izod impact test were conducted in the usual manners. Further, the samples were immersed in water at 20° C. for 24 hours, and then left to stand in an atmosphere having a relatively humidity of 44% for 25 weeks, whereupon the shrinkage, the bulk density and the water absorption were measured.

The results thereby obtained are as follows:

| | |
|---|---|
| Bending breaking strength: | 362 kg/cm$^2$ |
| Tensile breaking strength: | 128 kg/cm$^2$ |
| Izod impact strength: | 14 kg.cm/cm |
| Shrinkage upon drying: | 14.8 × 10$^{-4}$ |
| Bulk density: | 2.0 |
| Water absorption: | 10.5% |

EXAMPLE 2

A formed product was prepared in the same manner as Example 1 except that the same glass fiber mat as used in Example 1 except for the water permeability being 18 l/min. and the volume reduction rate being 6% was used and a mixture comprising 3 parts by weight of Portland cement, 3 parts by weight of sand (2,500 blaine), and 2 parts by weight of water, was used. The content of the glass fibers in the product was 5% by weight.

The physical properties measured in the same manner as in Example 1 were as follows:

| | |
|---|---|
| Bending breaking strength: | 390 kg/cm$^2$ |
| Tensile breaking strength: | 142 kg/cm$^2$ |
| Izod impact strength: | 13.5 kg.cm/cm |
| Shrinkage upon drying: | 15.6 × 10$^{-4}$ |
| Bulk density: | 2.1 |
| Water absorption: | 9.9% |

EXAMPLE 3

A formed product was prepared in the same manner as in Example 1 except that the same glass fiber mat as in Example 1 except for the water permeability being 24 l/min. and the volume reduction rate being 2% was used and a mixture comprising 3 parts by weight of Portland cement, 6 parts by weight of sand (2,500 blaine) and 3 parts by weight of water, was used. The content of the glass fibers in the product was 5% by weight.

The physical properties measured in the same manner as in Example 1 were as follows:

| | |
|---|---|
| Bending breaking strength: | 322 kg/cm$^2$ |
| Tensile breaking strength: | 109 kg/cm$^2$ |
| Izod impact strength: | 13.8 kg.cm/cm |
| Shrinkage upon drying: | 13.2 × 10$^{-4}$ |
| Bulk density: | 2.1 |
| Water absorption: | 10.9 |

We claim:

1. A glass fiber reinforced inorganic hardened body comprising an inorganic hardened material and a glass fiber reinforcing material, said fiber is prepared by: (1) coating it with a hardenable liquid resin having an alkaline elusion rate of at most 15%, (2) immersing it in an alkaline solution, and (3) heating it from 50 to 250 degrees C. for a period sufficient to provide a fiber reinforcing material having a water permeability of from 5 to 27 l/min. and a volume reduction rate of at most 10%.

2. The fiber reinforced inorganic hardened body according to claim 1 wherein the fiber reinforcing material is alkaline resistant glass fibers.

3. The fiber reinforced inorganic hardened body according to claim 1 wherein the inorganic hardened material is selected from ordinary Portland cement, alumina cement, blast furnace cement, white Portland cement, rapid-hardening Portland cement, gypsum and calcium silicate.

4. The fiber reinforced inorganic hardened body according to claim 3 wherein the inorganic hardened material includes a filler selected from sand, fly ash, slag, pearlite, vermiculite, diatomaceous earth and silus.

5. The fiber reinforced inorganic hardened body according to claim 1, or 2 wherein the fiber reinforcing material is incorporated in an amount of from 1 to 10% by weight.

6. The fiber reinforced inorganic hardened body according to claim 1 wherein the water permeability of the fiber reinforcing material is from 16 to 25 l/min.

7. The fiber reinforced inorganic hardened body according to claim 1 wherein the fiber reinforcing material is a mat formed by curling long glass fiber bundles into piles each having a weight of from 20 to 500 g per 1,000 m and coating and binding the piled bundles with a binder.

8. The fiber reinforced inorganic hardened body according to claim 7 wherein the diameter of each glass fiber bundle and the number of glass fibers constituting each glass fiber bundle are from 10 to 30μ and from 30 to 7,000, respectively.

9. The fiber reinforced inorganic hardened body according to claim 7 wherein the binder is a hardenable liquid unsaturated polyester, epoxy, phenol or melamine resin having an alkaline elusion rate of at most 15% by weight.

10. The fiber reinforced inorganic hardened body according to claim 7 wherein the binder is a mixture of a liquid unsaturated polyester resin and styrene in a weight ratio of from 100:100 to 300:100.

11. The fiber reinforced inorganic hardened body according to claim 7, 9 or 10 wherein the binder is used in an amount of from 1.5 to 48% by weight based on the glass fiber bundles.

12. A process for producing a fiber reinforced inorganic hardened body which comprises introducing a non-hardened hardenable inorganic material into a mold containing a fiber reinforcing material having a water permeability of from 5 to 27 l/min. and a volume reduction rate of at most 10% and aging and hardening the inorganic material.

13. The process according to claim 12 wherein the fiber reinforcing material is alkaline resistant glass fibers.

14. The process according to claim 12 wherein the non-hardened hardenable inorganic material is selected from ordinary Portland cement, alumina cement, blast furnace cement, white Portland cement, rapid-hardening Portland cement, gypsum and calcium silicate.

15. The process according to claim 14 wherein the non-hardened hardenable inorganic material is used in combination with a filler or additive selected from sand, fly ash, slag, pearlite, vermiculite, diatomaceous earth and silus.

16. The process according to claim 14 or 15 wherein the solid components in the inorganic material and the filler or additive have an average particle size of from 10 to 500μ.

17. The process according to claim 12 wherein the non-hardened hardenable inorganic material contains water in an amount of from 15 to 50% by weight.

18. The process according to claim 12 wherein the fiber reinforcing material is used in an amount of from 1 to 10% by weight based on the total weight of the materials used.

19. The process according to claim 12 wherein the fiber reinforcing material has a water permeability of from 16 to 25 l/min.

20. The process according to claim 12 wherein the fiber reinforcing material is a mat formed by curling long glass fiber bundles into piles each having a weight of from 20 to 500 g per 1,000 m and coating and binding them with a binder.

21. The process according to claim 20 wherein the diameter of each glass fiber bundle and the number of glass fibers constituting each glass fiber bundle are from 10 to 30μ and from 30 to 7,000, respectively.

22. The process according to claim 20 wherein the binder is a hardenable liquid unsaturated polyester, epoxy, phenol, melamine, SBR or acryl resin having an alkaline elusion rate of at most 15% by weight.

23. The process according to claim 20 wherein the binder is a mixture of a liquid unsaturated polyester resin and styrene in a weight ratio of from 100:100 to 300:100.

24. The process according to claim 20 wherein the binder is used in an amount of from 1.5 to 48% by weight based on the glass fiber bundles.

* * * * *